United States Patent
Chen et al.

(10) Patent No.: US 7,620,723 B2
(45) Date of Patent: Nov. 17, 2009

(54) NETWORK MANAGEMENT

(75) Inventors: Liangshen Chen, Cupertino, CA (US); Xiaojing Zheng, Santa Clara, CA (US)

(73) Assignee: Green Packet, Inc., Cupertino, CA (US)

( * ) Notice: Subject to any disclaimer, the term of this patent is extended or adjusted under 35 U.S.C. 154(b) by 0 days.

(21) Appl. No.: 10/585,081

(22) PCT Filed: Jan. 3, 2005

(86) PCT No.: PCT/US2005/000080

§ 371 (c)(1),
(2), (4) Date: May 10, 2007

(87) PCT Pub. No.: WO2005/066828

PCT Pub. Date: Jul. 21, 2005

(65) Prior Publication Data

US 2007/0271396 A1 Nov. 22, 2007

Related U.S. Application Data

(60) Provisional application No. 60/481,849, filed on Dec. 31, 2003.

(51) Int. Cl.
*G06F 15/16* (2006.01)
(52) U.S. Cl. .................. 709/227; 709/230; 709/237
(58) Field of Classification Search ............. 709/227, 709/230, 237

See application file for complete search history.

(56) References Cited

U.S. PATENT DOCUMENTS

| | | | |
|---|---|---|---|
| 5,771,275 A * | 6/1998 | Brunner et al. | 370/385 |
| 6,643,291 B1 * | 11/2003 | Yoshihara et al. | 370/395.5 |
| 6,963,739 B2 * | 11/2005 | Dorenbosch et al. | 455/406 |
| 7,237,025 B1 * | 6/2007 | Albert et al. | 709/225 |
| 7,296,071 B2 * | 11/2007 | Paila et al. | 709/226 |
| 2003/0079003 A1 | 4/2003 | Burr | |
| 2003/0179750 A1 | 9/2003 | Hasty, Jr. et al. | |
| 2006/0193315 A1 * | 8/2006 | Sinivaara et al. | 370/389 |

FOREIGN PATENT DOCUMENTS

CN 1409823 4/2003

OTHER PUBLICATIONS

Chinese Examination Report dated Nov. 12, 2008 in corresponding Chinese Application No. 200580006378.1.

* cited by examiner

*Primary Examiner*—Andy Ho
(74) *Attorney, Agent, or Firm*—Young & Thompson

(57) ABSTRACT

A system for discovering, identifying and managing ad hoc networks and facilitating the communications within that network is disclosed. An addition to the network interface mediates discovery of adjacent computers with the same addition running and the exchange of profiles between these computers to allow device sharing and routing.

9 Claims, 1 Drawing Sheet

NETWORK MANAGEMENT

The invention generally relates to the management of networks.

More particularly the invention relates to the ad-hoc creation and management of networks from available units.

BACKGROUND ART

It is known to create networks by wiring computers or other devices with a network interface to each other, or connecting them via wireless networks where a radio frequency connection replaces wiring. The interface will normally use either UDP (Universal Datagram Protocol) or TCP (Transmission Control Protocol) and IP (Internet Protocol) to provide for the forwarding of data packets from one device to another.

While such protocols allow for the transmission of data from one interface to another they do not allow for the sharing of resources between devices.

In most cases where a network exists a network server also exists which has explicit knowledge of the devices which it will allow to connect to its network and share the resources of the network. Unknown devices cannot connect.

An exception exists for some peer to peer protocols, where known computers can directly connect to other known computers or network devices without an intermediate server, but each such accepted computer must still be known to the computer it is connecting to in terms of IP address and access privileges.

A further exception exists for such things as wireless access points, where a public interface may be connected to by unknown wireless connections from computers, but there is normally no element of network management in the software of such access points, merely the ability to connect and share a single resource.

It would be preferable to be able to construct networks from an assemblage of whatever network devices are present in a particular place, to allow the sharing of resources and to identify one user to another if necessary. Currently this is not easily possible.

The present invention provides a solution to this and other problems which offers advantages over the prior art or which will at least provide the public with a useful choice.

SUMMARY OF THE INVENTION

In one exemplification the invention consists in a method of forming an ad-hoc network consisting of:

broadcasting or multi-casting from at least a first network interface on a first network capable device at least one data packet including a request to join an ad-hoc network and a profile of the requesting device, receiving at a second network interface on a second network capable device a request to join an ad-hoc network;

responding from the second network device to the first network device with a confirmation of receipt and a profile of the responding device.

Preferably the initial request to join is further broadcast or multi-cast the from the second network device.

Preferably the first network device may additionally broadcast or multi-cast packets requesting an identifying response from every network device capable of joining the network and within range.

Preferably the packets adhere to the IP protocol and the range is set by the TTL (time to live) information of an IP header.

Preferably the transmitted profile includes an ID unique to the profile, the ID containing information based on the device address and profile.

Preferably the profile includes information on the device user name, the ad-hoc network license identification and the MAC address.

Preferably when the network capable device is capable of operating on differing network mediums it transmits packets in all mediums.

Preferably wherein the network mediums include at least one wireless medium.

Preferably the network capable device is a computer and the presence of responding devices is shown on the computer display.

Preferably the presence of a responding device is as an icon on the computer display and wherein operations on the icon can show information on the profile or send a user message to the network device represented by the icon.

Preferably the computer may maintain a list of contactable network devices.

Preferably the list may include an attribute which prevents display of that network device presence.

Preferably a computer may have more than a single profile.

The method of claim 11 wherein the profiles are managed remotely via HTTP or HTTPS.

Alternatively the invention consists in an apparatus for forming an ad-hoc network consisting of:

a network capable device with at least one network interface the network interface being programmed to:

(a) contact adjacent network devices with information on the profile of the network capable device;

(b) respond to a request for information from a similar network capable device with information on its own profile (c) forward received profiles to other network capable devices.

Preferably the network capable device is a computer.

Preferably the computer is wireless capable.

Preferably the network uses TCP/IP protocol and the radius of the network from an individual device is set by the TTL parameter.

These and other features of as well as advantages which characterize the present invention will be apparent upon reading of the following detailed description and review of the associated drawings.

DESCRIPTION OF THE INVENTION

Figure 1:
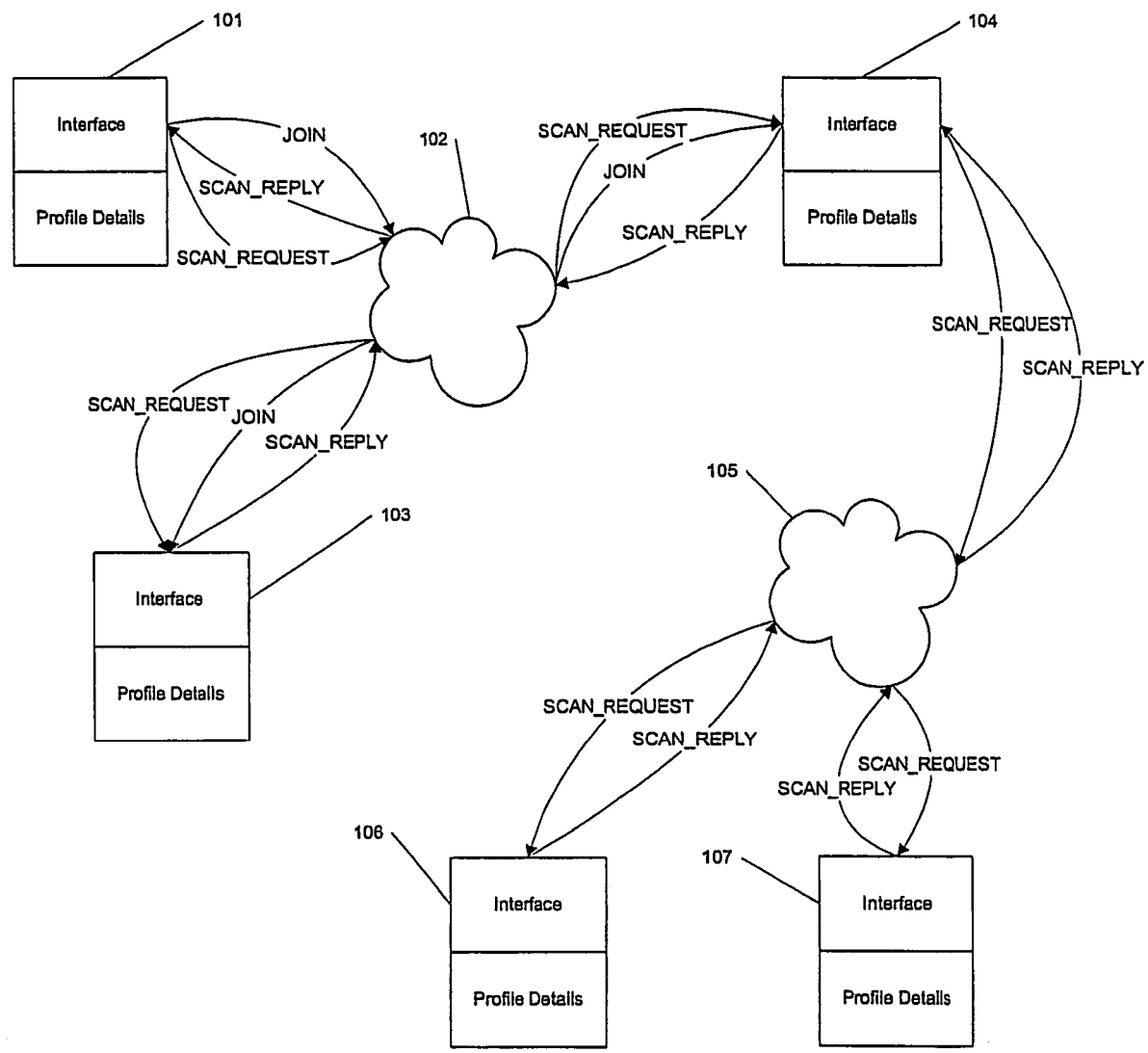
FIG. 1 is a general view of the communications which create the ad-hoc network.

The invention relates to creating ad-hoc networks, using individual items of equipment which are network capable, and with the ability to broadcast or multicast UDP or TCP/IP packets with a TTL (time to live) set to the desired radius of the network. Typically the items of equipment are computers, and normally mobile computers, but they may be switches, routers, servers, printers or other network capable equipment. The required functionality may be provided by separate hardware unit which is responsible for communicating on a desired protocol, e.g. 802.11a, 802.11b, 802.11g, Bluetooth or any similar wireless or wired protocol or it may merely be a software unit using the hardware already present on the item.

As described the network functions on TCP/IP, however any other packet protocol could be used. As is usual the TTL information is decremented by one each time a packet is rebroadcast and a packet with a TTL of zero is not rebroadcast, to provide a limit to the number of nodes accessible and the amount of network traffic created.

In operation, as shown in FIG. 1, from a computer 101 a first set of keep alive packets is broadcast on the network medium 102, normally wireless, to alert any close computers of the existence of a pending message. Typically the TTL for the keep alive messages is set as low as 1 so that only directly accessible computers are contacted. The computer then issues a JOIN message which may be received by any units within range such as 103, 104. The range is generally set as the desired network radius in terms of nodes accessed. Computers receiving the JOIN message can return a SCAN_REPLY addressed to the originating computer while re-broadcasting the JOIN packet if the TTL is still alive.

Each message contains the identity of the computer issuing it (or, rather, the MAC address of the interface), and as part of the packet content, the profile of the user of the computer together with a profile ID.

Access to facilities on other computers is based on the profile and its privileges on the other computers. Thus if an ad-hoc network is created within a workplace it can be expected that a profile may have extended privileges on workmates computers, while an ad-hoc network at an airport might be expected to have only access to a public internet access point, if necessary via intermediate computers acting as routers.

A profile may contain various information about the computer user, such as the password required to operate the profile, the real name, gender, phone number and email address.

A single computer may contain the profiles of one or more users, and each profile has a unique ID on the network, normally controlled by the license number of the ad-hoc networking software. Each profile may also contain details on the inter-relationship with the network, for instance the control of the wireless interface and what frequencies should be scanned, though this may alternatively be held in the normal operating system profiles. An additional part function of the networking software may be the allocation of an IP address.

Since there may be no IP allocating server on the network which forms from multiple computers it is necessary that there be a method of allocating an IP address to each profile on the computer. This may either be done by applying a default IP address to each profile or by detecting the class or sub-class of an IP address detected on the ad-hoc network and allocating an unused address within a nominated range.

To provide unique profile names on the network, since the user name which is normally used as a unique profile identifier may be duplicated on an ad-hoc network, a guaranteed unique identifier is required. This may be assembled from items including unique identifiers available to the computer, these being the MAC address of the network interface, and the unique identifier of the software license instance used by the profile. The IP address may also be included. The identifier would normally be concatenated with the standard user profile name to allow easy extraction of a user name.

Profiles for users of the network may be extracted from the packets and may be displayed as icons on the screen of computers attached to the network. A simple click on the icon may display details of the profile, or serve to provide a message connection to that user.

The network itself may also have a unique existence, since it is quite possible for two ad-hoc networks to form independently and expand as new computers join until the network edges overlap. Normally a computer in contact with two networks may act to join them together into one, but the size of a network may be limited for traffic reasons by the TTL setting chosen for the network and in such an instance a computer more than the chosen number of hops away from another will not have contact with it, and can be considered as being in a different network. Clearly the ability to contact various network nodes will vary as devices linked to others enter or leave the network.

To ensure that each computer has a valid "picture" of the network it may issue a multi-cast or broadcast SCAN_REQUEST at intervals including its profile identification and an additional unique request ID. Receiving units both replicate the request on, to the TTL limit, and return a SCAN_REPLY to the originating computer with their profile and the request ID.

Individual computers may also broadcast status information when a status change occurs on the computer. Such statuses may include offline, invisible (i.e. not to appear as an accessible computer), busy, idle or some other user chosen status. This information may appear beside a desktop icon of the profile on a remote computer. The information may include the number of network hops to each located computer, unless the originating computer indicates that it prefers not to show this.

Management of profiles on a computer may be local, via a local management program, or may be via a remote linkage, for instance via HTTP or HTTPS.

Individual profiles on a computer may also maintain a list of profile data versus the MAC address or IP address of other computers encountered on the network to act as a quick lookup for this information. Where a new computer is encountered on the network the address and profile information may be added to the list, and correspondingly where a computer has not been found on the network or accessed for a specified period it may be deleted from the list. Where a user wishes to contact a specified profile which is not in the listing a SCAN for that particular profile may be initiated.

The list may also include an attribute to allow marking an address as black-listed, thus preventing the computer and its profile from appearing to the user. Management functions allow the list to be altered at will by the user.

To provide security within the network the contents of the packets may be encrypted, so that all profile information is encrypted. The encryption and decryption forms part of the content creation and monitoring software.

Where a computer is capable of working on more than one wireless frequency it may query on all available channels and may act as a router between channels for the network, if its profile allows this. This will essentially allow two or more joined networks to co-exist in the same physical area, with the disadvantage that they will become separated if the routing computer is taken offline or moves out of the area.

The extensions to the network interface required to allow performance of the invention may be implemented either as hardware or as software.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the network interface may vary dependent on the particular application for which it is used without variation in the spirit and scope of the present invention.

In addition, although the preferred embodiments described herein are directed to computers with network interfaces for use in a TCP/IP system, it will be appreciated by those skilled in the art that the teachings of the present invention can be applied to other systems such as NETBEUI, without departing from the scope and spirit of the present invention.

What is claimed is:

1. A method of forming an ad-hoc wireless network under the control of ad-hoc software consisting of:

broadcasting or multi-casting from at least a first wireless network interface on a first wireless network capable device at least one data packet from software including a request to join an ad-hoc network and a profile of the requesting device, the profile including the MAC address of the wireless network interface and the unique identifier of a software license instance, receiving at a second wireless network interface on a second wireless network capable device under the control of networking software the at least one data packet being the request to join the ad-hoc wireless network;

responding from the second wireless network device to the first wireless network device with a confirmation of receipt and a profile of the responding device.

2. The method as claimed in claim 1 wherein an initial request to join is further broadcast or multi-cast from the second wireless network device.

3. The method as claimed in claim 1 wherein the first wireless network device may additionally broadcast or multicast packets requesting an identifying response from every wireless network device capable of joining the ad-hoc wireless network and within range.

4. The method as claimed in claim 1 wherein each of the first wireless network capable device and the second wireless network device is a computer and the presence of responding devices is shown on a computer display.

5. The method as claimed in claim 4 wherein the presence of a responding device is as an icon on the computer display and wherein operations on the icon can show information on the profile or send a user message to a network device represented by the icon.

6. The method as claimed in claim 4 wherein the computer may maintain a list of contactable wireless network devices.

7. The method as claimed in claim 6 wherein the list may include an attribute which prevents display of that wireless network device presence.

8. The method as claimed in claim 1 wherein the profile further includes an IP address.

9. An apparatus for forming a wireless ad-hoc network consisting of:

a wireless network capable device with at least one wireless network interface implemented in software, the wireless network interface being programmed to:

(a) contact adjacent wireless network devices with information on the profile of the wireless network capable device, the profile including the MAC address of the wireless network interface and the unique identifier of a software license instance;

(b) respond to a request for information from a similar network capable device with information on its own profile (c) forward received profiles to other network capable devices.

* * * * *